Aug. 4, 1942.  C. EMMEY  2,291,955
APPARATUS FOR APPLYING THERMOPLASTIC MATERIAL ONTO RECEPTIVE LAYERS
Filed June 12, 1940  3 Sheets-Sheet 1

INVENTOR.
CHARLES EMMEY
BY
ATTORNEY.

Aug. 4, 1942.                C. EMMEY                2,291,955
APPARATUS FOR APPLYING THERMOPLASTIC MATERIAL ONTO RECEPTIVE LAYERS
Filed June 12, 1940           3 Sheets-Sheet 2

INVENTOR.
CHARLES EMMEY
BY
Joseph F. Padlon
ATTORNEY.

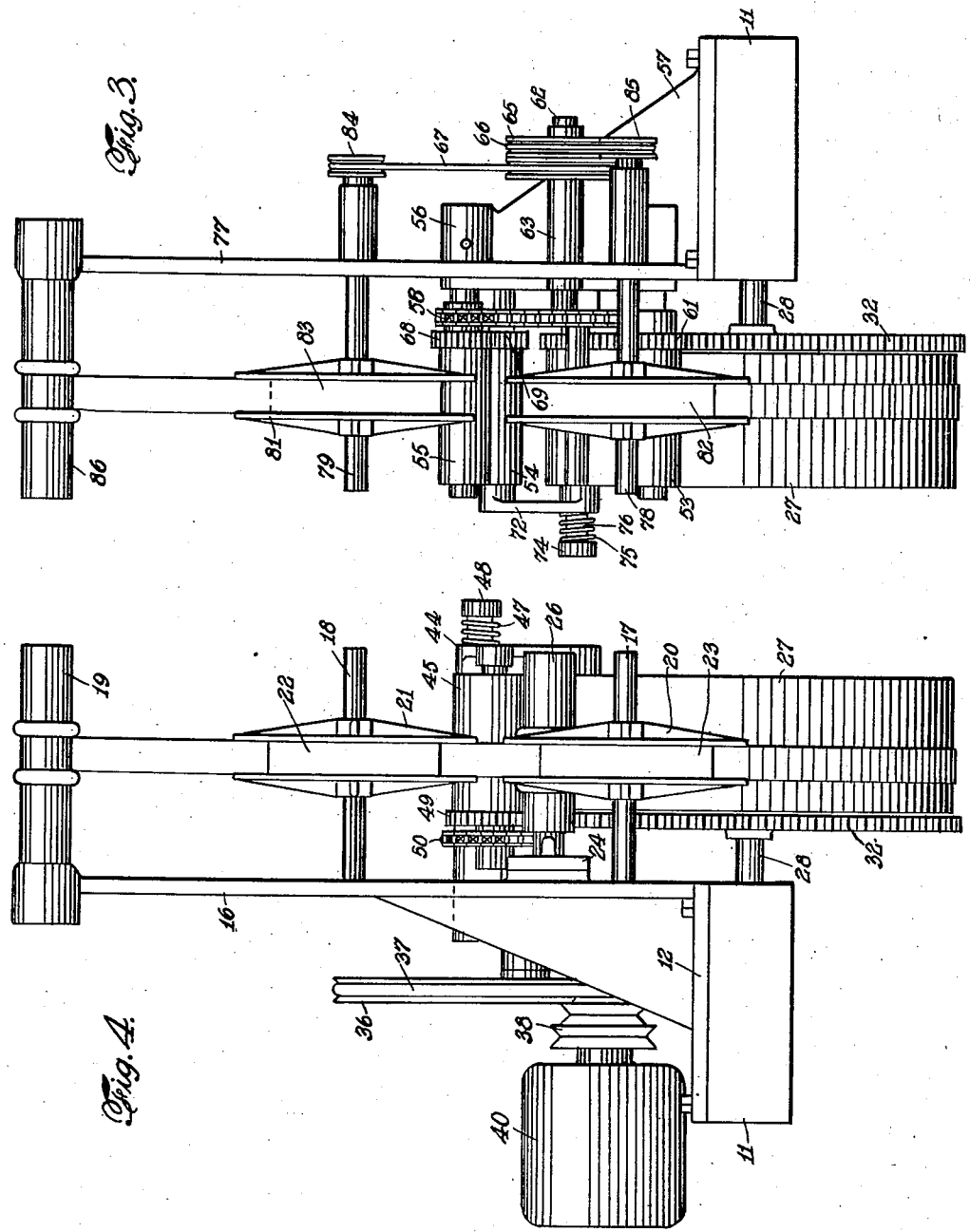

Patented Aug. 4, 1942

2,291,955

UNITED STATES PATENT OFFICE 2,291,955

APPARATUS FOR APPLYING THERMOPLASTIC MATERIAL ONTO RECEPTIVE LAYERS

Charles Emmey, New York, N. Y.

Application June 12, 1940, Serial No. 340,040

3 Claims. (Cl. 154—37)

This invention relates to tape coating machines. More particularly, it relates to apparatus for continuously applying thermoplastic cementing sheets or layers over a heated receptive base and simultaneously heating and covering the sheets with nonadhesive strips to prevent the thermoplastic sheet from sticking when rolled over itself by the machine. Labels and the like generally used in the clothing industry, showing a mark or other identifying characteristic of ownership or origin of goods are usually applied on to linings of coats, hats, shirts, underwear, towels and the like, either by sewing or by embroidering. In time, the stitching of the label becomes loosened from the lining and is lost. Furthermore, considerable expense and time are required in sewing such labels onto the goods, thereby increasing the cost of manufacturing and selling such materials.

With the above and other disadvantages in view, it is one of the objects of the present invention to provide novel and simply constructed apparatus for continuously applying a heated cement tape onto a receptive surface.

Another object of this invention is to provide apparatus for continually laying thermoplastic films or sheets over a traveling receptive base while under tension.

Another object of the present invention is to provide apparatus for applying a thermoplastic sheet onto a heated receptive base while maintaining the latter under tension and continuously cooling the same after the application of the thermoplastic sheet thereon.

One other object of this invention is to provide an efficient tape coating machine adapted to continually heat and apply a thermoplastic sheet over a receptive base, continually traveling through the machine and covering the exposed thermoplastic sheet with a nonadhesive strip of corresponding width to prevent the thermoplastic sheet from adhering when rolled over itself by the machine.

One further object of the present invention is to provide easily operable apparatus forming a novel combination of parts adapted to maintain a continuously moving receptive layer and superimposed cementitious thermoplastic layer under tension and welding the same to form a resultant laminated product.

Other objects and advantageous features of the present invention will become apparent from the following detailed description taken in connection with the accompanying drawings showing a preferred embodiment thereof. In the drawings:

Fig. 3 is an end elevation view taken at the right end of Fig. 1, and

Fig. 4 is an end elevation view taken at the left end of Fig. 1.

Figure 1:
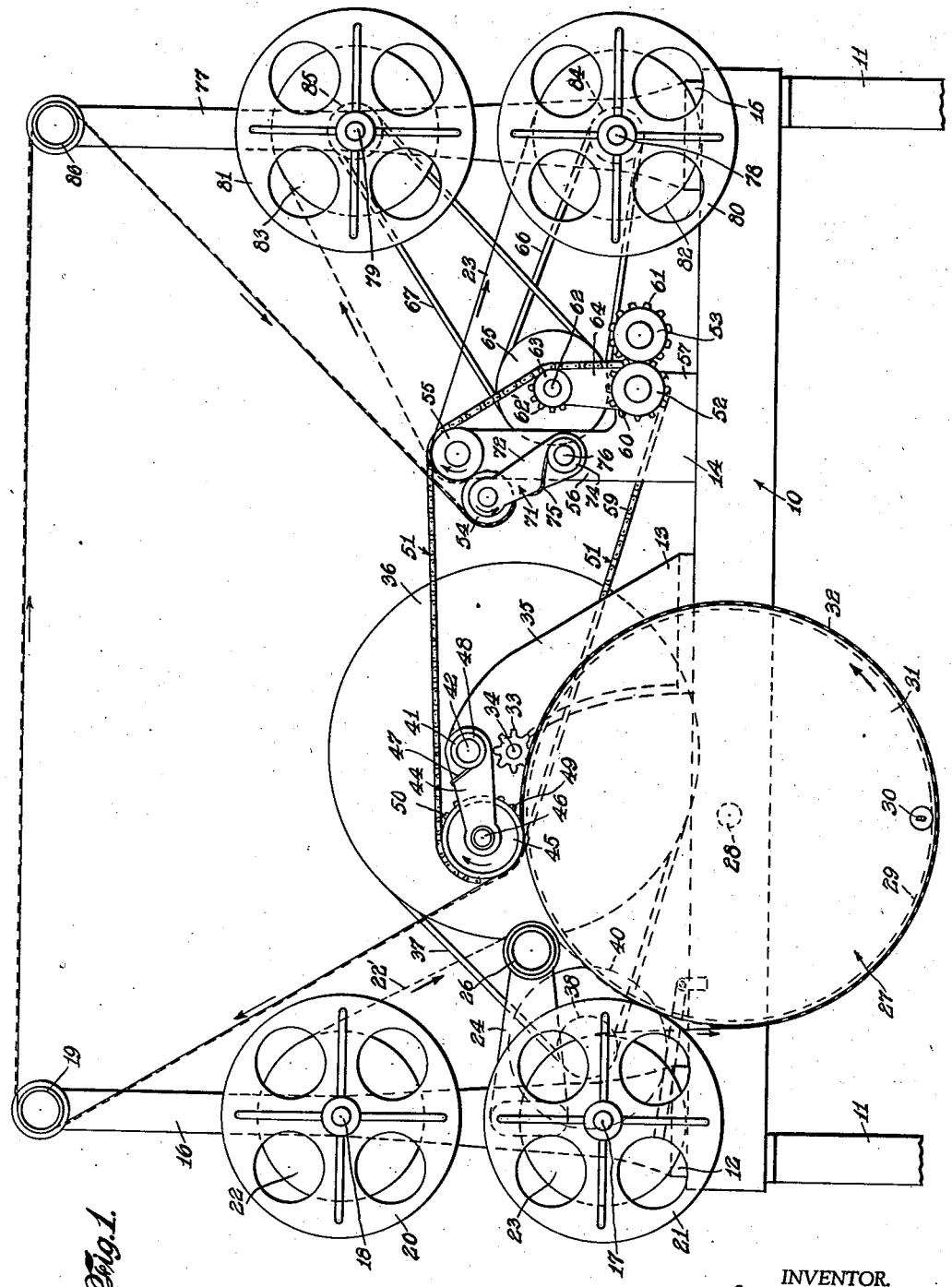
Fig. 1 is an elevation of a preferred embodiment of my invention.

Referring now to the drawings in which similar reference characters represent like parts throughout, a frame 10 is provided which may be mounted on suitable supports 11 such as a table, platform, props, etc., and held in position by a plurality of bolts, not shown. Mounted on the frame are a plurality of base plates 12, 13, 14 and 15 respectively, disposed in spaced relation with each other. Each of said base plates is adapted to support various parts of the apparatus as will be hereinafter described more in detail.

Referring to base plate 12, there is provided integral therewith an extensible vertical support member 16 of any desirable height. Said support is provided intermediate its ends with a plurality of spaced horizontal bars 17 and 18, disposed above each other and at the top with a highly polished hollow cylindrical member 19 suitable to accommodate a cooling medium. It is to be noted that said horizontal bars 17 and 18 are adapted to accommodate wheels 20 and 21, respectively, which may be retained on said shafts by any suitable means such as set screws. Said wheel 20 is provided for retaining a reel 22 of thermoplastic cementitious strip 22' having a removable covering of glassive paper and the like, while wheel 21 is provided for a reel 23 of cloth. Intermediate bars 17 and 18 on support 16 there is disposed a fixed member 24 projecting laterally at right angles to said bars and support. Said projecting member 24, in turn is provided with an outwardly extending horizontal bar 25 parallel with the other horizontal bars 17 and 18 and lying in the same vertical plane therewith.

Fixed onto said bar 25 is a highly polished hollow cylindrical guide member 26 adapted to permit passage of the material from reel 22 thereover and also to accommodate any suitable cooling medium.

Figure 2:
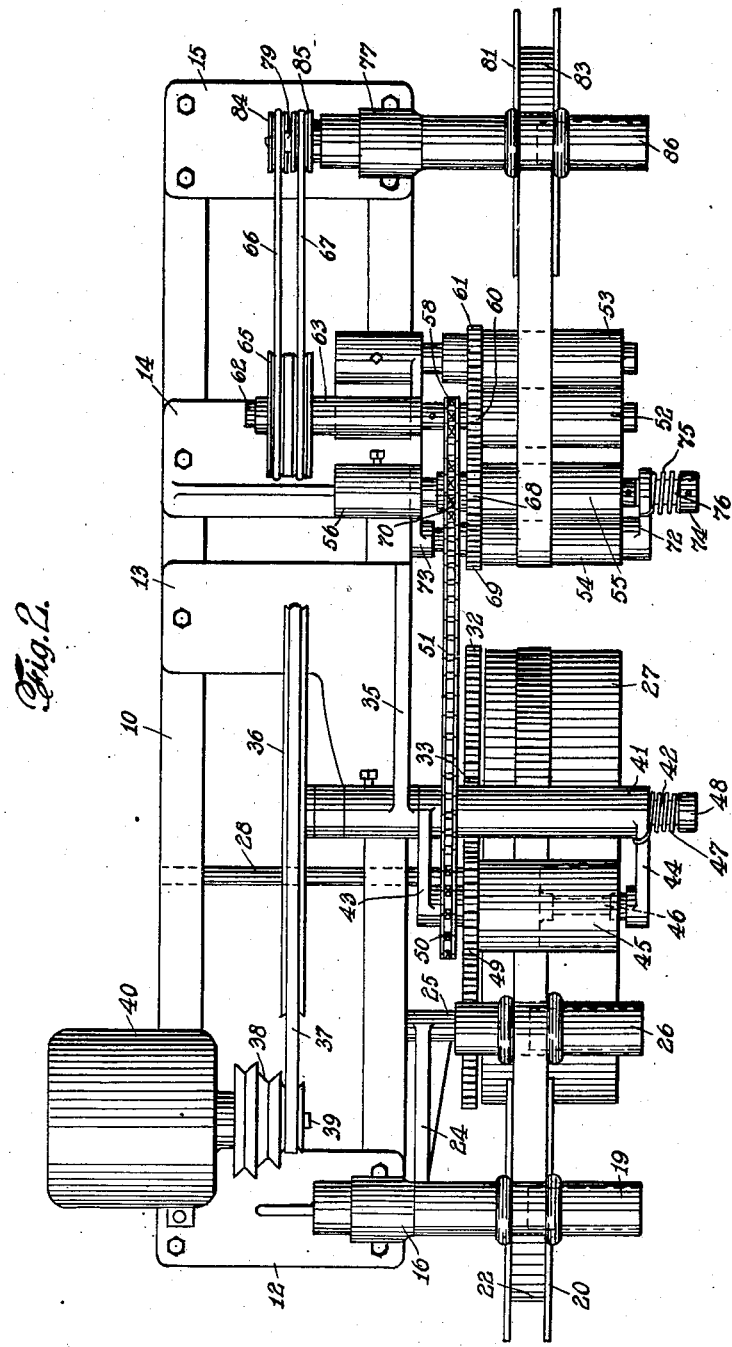
Fig. 2 is a plan view of the elevation shown in Fig. 1.

Disposed adjacent lower reel 21 is a revoluble drum 27 mounted on a horizontal shaft 28 extending and fixed into frame 10 by any suitable means as shown. It is to be noted that said drum extends from the shaft, adjacent one of the edges of frame 10 and is in line with the planes of wheels 20 and 21. It is to be noted that the drum is of sufficient width to accommodate material from reels 22 and 23 having any desirable width. Inside said drum is a heating unit 29 disposed around the interior adjacent surface of said drum for heating the same. Said unit as shown is preferably an electrical heat resistance unit, but it may be also of any other desirable type. A switch 30 is provided on the face 31 of the drum to set the heating unit in operation. Said face of the drum is fixed while the periphery thereof is in motion when the device is in operation. In order to operate drum 27 there is provided a geared peripheral edge 32 adjacent the frame 10, in connection with spur gear 33 mounted on shaft 34. Said shaft is pivotally mounted on a brace 35 integral with base plate 13. Said brace, as shown, extends diagonally upward having a wide basal end portion for supporting said shaft 34 therein and is integral with base 13. It is to be noted that the shaft 34 at its other end is provided with a grooved pulley wheel member 36 as shown in Fig. 2, fixed thereto for accommodating a drive belt 37. Said belt in turn is also connected with a stepcone pulley wheel 38 mounted on the drive shaft 39 of a motor 40 fixed to base 11.

Disposed above shaft 34 is a sleeve 41 mounted on an individual shaft 42 having a plurality of spaced extending arms 43 and 44 respectively. Said arms are adapted to retain a highly polished cylindrical revoluble member 45 in axial position by means of inwardly extending axial member 46. In order to keep said member 45 in position adjacent the periphery of drum 27, a spring member 47 is provided fixed at one end to one of the arms 44 and at the other end to the head 48 of shaft 42. It is to be noted that member 45 is provided at one end with a spur gear 49 which is in mesh with the geared edge 32 of drum 27. Disposed adjacent said gear 49 and mounted on shaft 46 of cylinder 45 is a sprocket gear 50 adapted to accommodate sprocket chain 51 thereon. It is to be noted that member 45 is also hollow and adapted to accommodate a cooling medium therein. Also said members 26 and 45 are disposed near each other as shown whereby most of the periphery of drum 27 is used for thermowelding strips 23 and cementitious strip 22' together.

Adjacent base 13 is base 14 on which is mounted a plurality of parallel, horizontal, roller members 52, 53, 54 and 55 disposed in cooperative relation as more fully described hereinafter. Said base 14 is provided with an upwardly extending portion 56 and a lower outwardly extending portion 57. Mounted on portion 57 is rotatable, rubber surfaced roller member 52 at one end of which is a gear 58 for engaging links 59 of chain 51. Said member 52 is further provided with an idling gear 60 disposed adjacent said gear 58 for engaging a gear 61 of horizontally disposed equalizing cylindrical member 53 also mounted on portion 57. Said equalizing members 52 and 53 are in parallel but frictional relationship. Disposed above member 52 is a cross shaft 62 mounted in bearing 63 of upward extension 64. At one end of shaft 62 is a double grooved pulley wheel 65 for accommodating drive belts 66 and 67, respectively. Intermediate the ends of said shaft 62 is a gear wheel 62' driven by chain 51. Disposed at the top of upright extension 56, is rubber surfaced roller member 55 one end of which is provided with gear 68 adapted to engage a gear 69 on roller member 54. Adjacent said gear 69 is a spur gear 70 whose teeth engage the links 59 of sprocket chain 35 to permit rotation of the same.

Roller 54 has a rubber surface and is mounted on a movable brace support 71 having parallel arms 72 and 73 pivoted to upright extension 56; said roller is kept in frictional abutment against the peripheral surface of member 55 by means of movable brace support 71 which is retained in tensioned condition towards upright extension 56 by means of spring member 75, one of whose ends is fixed to arm 72 and the other end thereof is fixed to collar 74 of shaft 76 mounted on extension 56. It is to be noted that said spring member keeps brace support 74 in a diagonal position toward upward extension 56, whereby roller 54 abuts roller 55 to frictionally drive the laminated material therethrough as shown.

Adjacent base 14 is base 15 having an upwardly extending portion 77 integral therewith on which are mounted a plurality of shafts 78 and 79 respectively, and disposed in spaced relation thereon. Said shafts are horizontally above each other and adapted to accommodate wheels 80 and 81 respectively, being retained thereon by any suitable means. Said wheels are adapted to retain reels 82 and 83 respectively, thereon. Reel 82 consists of the cloth material 23 with the thermoplastic cementitious film on one surface thereon, while reel 83 consists of the paper from which the cementitious film has been removed during the operation of the device. Furthermore, said wheels 80 and 81 are rotated by means of belts 66 and 67 respectively, which are accommodated in grooved wheels 84 and 85. Said wheels are mounted on one end of shafts 78 and 79 respectively as shown in Fig. 2 to actuate the shafts and permit winding of the laminated material into roll 82 and the paper into reel 83.

In the operation of the apparatus embodied in the invention, herein described, reel or roll 22 of thermoplastic cementitious film material is mounted on bar 18 and retained by wheel 20. Said roll 22 has an upper layer of paper to prevent adhesion of the film to itself when in rolled condition as shown. On shaft or bar 17 is another reel 23 of cloth material corresponding in width to that of the thermoplastic film and paper material to permit one to be laid over the other. Said film material 22' from the roll 22 is passed around highly polished and smooth surfaced cylindrical member 26 and onto the periphery of rotating drum 27 which is heated by means of unit 29. The heat of friction in the thermoplastic material is dissipated by the cooling agent in the member or roller 26 so that at the point of contact of the base material 23 the thermoplastic material will be at a definitely uniform temperature acquired exclusively from the heated drum 27. It is to be noted that the paper strip forms frictional contact with the drum 27, and the cementitious material is adapted to contact one surface of cloth material 23 which is simultaneously being passed over the drum 27. The paper strip being adjacent the heated periphery of drum 27, prevents the cementitious material from sticking to the drum. By the time the superposed strips of thermoplastic and cloth materials have passed a major portion of the surface of the drum they are fused and held under tension while passing across the surface of the highly polished cylindrical member 45 which rotates in a clockwise manner as shown. It will be noted that the material 23 comes into contact with the surface of the thermoplastic material without the application of pressure to the material 23, and at a point which is spaced from the point of initial contact of the thermoplastic strip with the drum 27 in the direction of rotation of said drum. In the rotation of the drum between these spaced points, the thermoplastic material acquires the proper degree of adhesiveness so that without the application of lateral pressure against the material 23 a secure bond between the two materials is obtained while possible distortion and non-uniformity of thickness of the thermoplastic strip is avoided. The smooth and highly polished surface of member 45 permits the heat in the thermowelded layers of material to be dissipated. After being passed across said member 45, the fused strips of cloth and cementitious materials are carried over highly polished member 19 mounted at the top of vertical support 16. It is to be noted that said member 19 like cylinders 45 and 86 are hollow and adapted to accommodate a cooling medium therein such as dry ice or circulating compressed air to hasten the cooling of the cementitious film onto the cloth and fuse with the same. From said member 19, the fused strips travel over another cylindrical hollow member 86 mounted at the top end of shaft 77. As stated, said member 86 is adapted for the same purpose as cylinder 19 indicated above. The resultant laminated strip after passing over cylinder 86, then travels between tension rollers 54 and 55 which rotate counter to each other, as shown by the arrows in Fig. 1. The rubber surface of said rollers keeps the strip in a taut condition to permit even fusing of the cementitious material onto the cloth layer during the heating and laminating operation. From roller 55, the paper strip is rolled onto shaft 79 by means of belt 67 to form a reel of paper, while the fused cloth and tape are rolled around shaft 78 by means of belt 66.

From the description of my invention, taken in conjunction with the drawings herein, it is to be noted that I have provided apparatus adapted for the simultaneous thermowelding of cloth and cementitious material, drawing the fused strips and rolling them all in a continuous operation. Furthermore, I have provided means for cooling said strips at certain intervals when traveling from the area of heating of same to the area of rolling the strips and separating the paper from the cloth and thermoplastic fused strips. According to the invention as described, the receptive material used may be any of suitable kind, such as textiles, paper, or other material of cellulosic origin. By the present invention, the materials to be laminated may be of any width. Furthermore, the laminated materials may be used for purposes other than as labels. It also may be used as interlining in suits, coats and the like.

The present invention is an improvement on that described in my copending application bearing Serial No. 175,900, filed November 22, 1937, now Patent No. 2,217,199, issued October 8, 1940.

While one preferred form of my invention has been described in connection with the accompanying drawings, it is to be understood and noted that various changes as to form, use of materials and arrangement of parts may be made without departing from the spirit and scope of the present invention as set forth in the appended claims.

I claim:

1. In apparatus for joining thermoplastic to non-thermoplastic strip material, a rotatably mounted member and heating means therefor, means for feeding the thermoplastic strip into contact upon the periphery of said member, means for pre-cooling the thermoplastic strip, and means in non-pressure applying relation to said member for feeding the non-thermoplastic strip in superimposed contact upon the thermoplastic strip at a point in spaced relation to the point of initial contact of the latter with said rotatable member whereby heat is transmitted through the thermoplastic material to the contacting surfaces of said strips.

2. In apparatus for joining thermoplastic strip material having a non-adhesive film on one side to a strip of non-thermoplastic material, a rotatable member and means for heating the same, means for directing the thermoplastic strip to contact the non-adhesive film thereof with the periphery of said member, and means in non-pressure applying relation to said member for directing the non-thermoplastic strip into contact upon the exposed surface of said thermoplastic strip, at a point in spaced relation from the point of initial contact of the latter with said member, in the direction of rotation of said member, whereby heat is transmitted exclusively through said non-adhesive film and the thermoplastic material to the contacting surfaces of said strips.

3. In apparatus for joining thermoplastic strip material having a non-adhesive film on one side to a strip of non-thermoplastic material, a rotatable member and means for heating the same, a hollow rotatable guide member for the thermoplastic strip adapted to receive a cooling medium and to direct the movement of said strip with the non-adhesive film thereof into contact with the periphery of said rotatable heated member, means for directing the non-thermoplastic strip into superimposed contact upon the exposed surface of the thermoplastic strip whereby heat is transmitted exclusively through said non-adhesive film and the thermoplastic material to the contacting surfaces of said strips, means for tensioning the composite strip upon the periphery of said rotatable heated member whereby the strips are joined under heat and pressure, means for thereafter cooling the composite strip, and a pair of reels one of which receives said non-adhesive film while the other receives said composite strip.

CHARLES EMMEY.